SIMPLIFIED CHASSIS FOR ELECTRONIC EQUIPMENT

Filed April 11, 1947 8 Sheets-Sheet 1

INVENTOR.
Donald H. Mitchell
BY Foorman L. Mueller
Atty.

Jan. 8, 1952

D. H. MITCHELL 2,581,967

SIMPLIFIED CHASSIS FOR ELECTRONIC EQUIPMENT

Filed April 11, 1947

8 Sheets-Sheet 2

INVENTOR.
Donald H. Mitchell
BY Foorman L. Mueller
Atty.

SIMPLIFIED CHASSIS FOR ELECTRONIC EQUIPMENT

Filed April 11, 1947 8 Sheets-Sheet 3

INVENTOR.
Donald H. Mitchell
BY Foorman L. Mueller
Atty.

SIMPLIFIED CHASSIS FOR ELECTRONIC EQUIPMENT

Filed April 11, 1947 8 Sheets-Sheet 4

INVENTOR.
Donald H. Mitchell
BY Foorman L. Mueller
Atty.

Jan. 8, 1952 D. H. MITCHELL 2,581,967

SIMPLIFIED CHASSIS FOR ELECTRONIC EQUIPMENT

Filed April 11, 1947 8 Sheets-Sheet 5

INVENTOR.
Donald H. Mitchell
BY Norman L. Mueller
Atty.

Jan. 8, 1952 D. H. MITCHELL 2,581,967

SIMPLIFIED CHASSIS FOR ELECTRONIC EQUIPMENT

Filed April 11, 1947 8 Sheets-Sheet 6

INVENTOR.
Donald H. Mitchell
BY Norman L. Mueller
Atty.

SIMPLIFIED CHASSIS FOR ELECTRONIC EQUIPMENT

Filed April 11, 1947

INVENTOR.
Donald H. Mitchell
BY Norman L. Mueller
Atty.

Jan. 8, 1952 D. H. MITCHELL 2,581,967

SIMPLIFIED CHASSIS FOR ELECTRONIC EQUIPMENT

Filed April 11, 1947 8 Sheets-Sheet 8

INVENTOR.
Donald H. Mitchell
BY Foorman L. Mueller
Atty.

UNITED STATES PATENT OFFICE 2,581,967

SIMPLIFIED CHASSIS FOR ELECTRONIC EQUIPMENT

Donald H. Mitchell, Chicago, Ill., assignor to Motorola, Inc., a corporation of Illinois Application April 11, 1947, Serial No. 740,825

3 Claims. (Cl. 173—324)

This invention relates generally to a chassis for electronic equipment and more particularly to a radio receiver including a simplified chassis on which the components of the receiver are mounted.

In the prior art it has been the general practice to provide a chassis for a radio transmitter or receiver on which the various components of the transmitter or receiver are mounted. The chassis is then mounted in a cabinet which encloses the transmitter or receiver, the chassis including the operating parts of the set being generally independent of the cabinet. The components are then connected in a circuit by connecting wires thereto, this generally being accomplished by soldering the wires to terminals provided on the components. The mounting and connecting of the components is for the most part done by hand and requires a relatively large amount of time. Various attempts have been made to provide a chassis wherein the conductors necessary for connecting the components of the set in a circuit are built directly into the chassis, but difficulty has been encountered in such chassis in providing a simple arrangement for the conductors to cross each other as is required in the usual circuit for radio or other electronic equipment. This and other difficulties have resulted in such chassis being complicated and expensive to manufacture thereby generally defeating the purpose of the composite chassis, that is to reduce the time required in assembling and wiring the set and thereby substantially reduce the manufacturing cost thereof.

It is an object of the invention, therefore, to provide an improved and inexpensive chassis for electronic equipment in which means for interconnecting the components is provided as a part of the chassis.

It is a further object of this invention to provide electronic equipment including a chassis with a plurality of circuit components thereon, in which the chassis includes connecting means having quick detachable terminals for supporting and electrically connecting the components.

A still further object of this invention is to provide improved plug-in terminals for mounting and connecting various electronic circuit components.

It is another object of this invention to provide an improved radio receiver in which all the operating components are mounted on a chassis which is supported in a cabinet in an easily removable manner.

A feature of this invention is the provision of a chassis for electronic equipment made of two sheets of insulating material with a plurality of prefabricated conducting strips supporting therebetween which include terminals arranged to support and electrically connect the components of the equipment.

A further feature of this invention is the provision of a radio chassis including conducting strips supported between insulating sheets for connecting components of the equipment in a circuit, in which certain of the components are utilized for providing the necessary crossovers of the conducting strips.

Another feature of this invention is the provision of conducting strips having terminals thereon including resilient portions adapted to removably support and electrically connect electrical components.

A still further feature of this invention is the provision of a radio receiver chassis on which the components of the receiver are supported and which includes a frame work on which a loop antenna is wound, the chassis including connecting means permitting easy removal of the chassis and all operating structure of the receiver from the receiver cabinet.

Further objects, features and advantages of this invention will be apparent from a consideration of the following description taken in connection with the accompanying drawings in which.

In practicing my invention I provide a chassis for supporting and interconnecting the components of electronic equipment consisting of a pair of insulated sheets each of which have openings therein and a plurality of conducting strips positioned between the sheets having terminals thereon for supporting and connecting the components of the electronic equipment. The components are arranged with vacuum tubes, intermediate frequency units, and other large components supported on one side of the chassis and with condensers and resistors and similar components supported on the other side of the chassis. The terminals of the vacuum tubes and intermediate frequency units extend through openings in the sheets and make connection with the terminals of the conducting strips. Connections are made to the resistors and condensers through terminals on the strips which project through openings in one of the insulating sheets and form clips for removably supporting and connecting the components. The conducting strips are constructed with the terminals arranged to be positioned in openings in one of the insulating sheets to properly position the conducting strips. The space within the insulating sheets and between the terminals for supporting components such as resistors and condensers may be utilized for conducting strips in other circuits to thereby provide simple circuit crossovers. Alternatively a conducting strip may have a portion thereof formed as a loop which extends through an opening in one of the sheets to permit crossing over another conducting strip. The chassis also includes quickly detachable connectors for mounting the chassis in the radio cabinet and a framework for supporting a loop antenna. This provides a complete operable radio receiver which may be easily removed from the cabinet.

Figure 1:
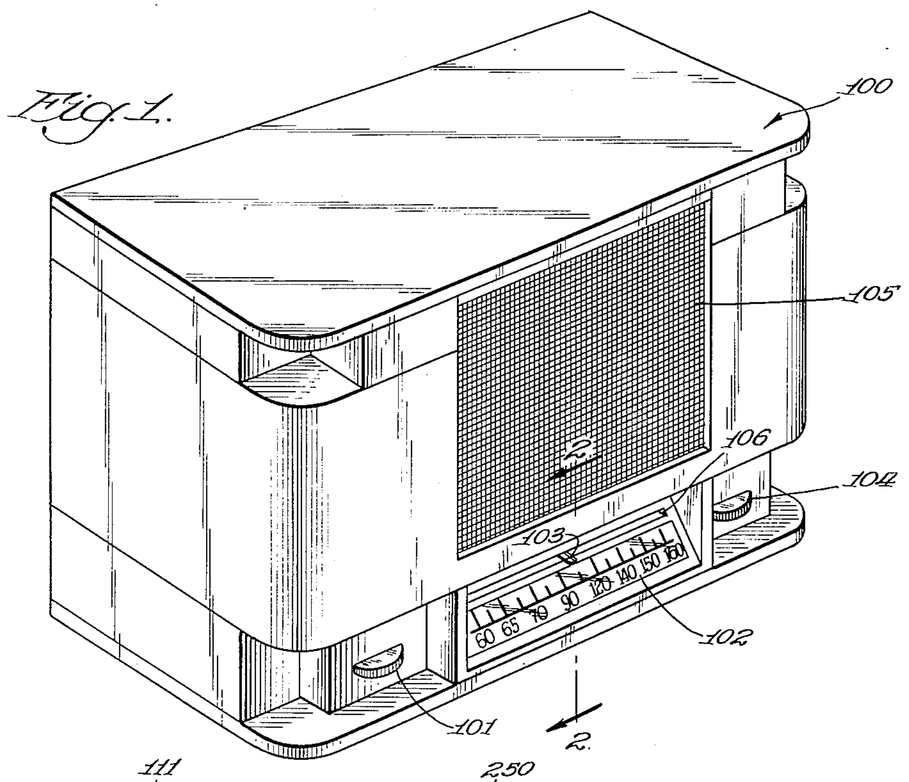
Fig. 1 is a perspective view of a radio receiver in accordance with the invention.

Referring now to the drawings, Fig. 1 illustrates a radio receiver generally indicated at 100 and including a tuner control wheel 101, a scale 102 and pointer 103 for indicating the setting of the tuner, and a volume control wheel 104. A grille work 105 is provided above the scale adjacent to which a loud speaker is placed as will be described. It is to be pointed out that the particular cabinet design and the arrangement of the components therein is merely illustrative and various other designs and arrangements are possible in accordance with the invention.

Figure 2:
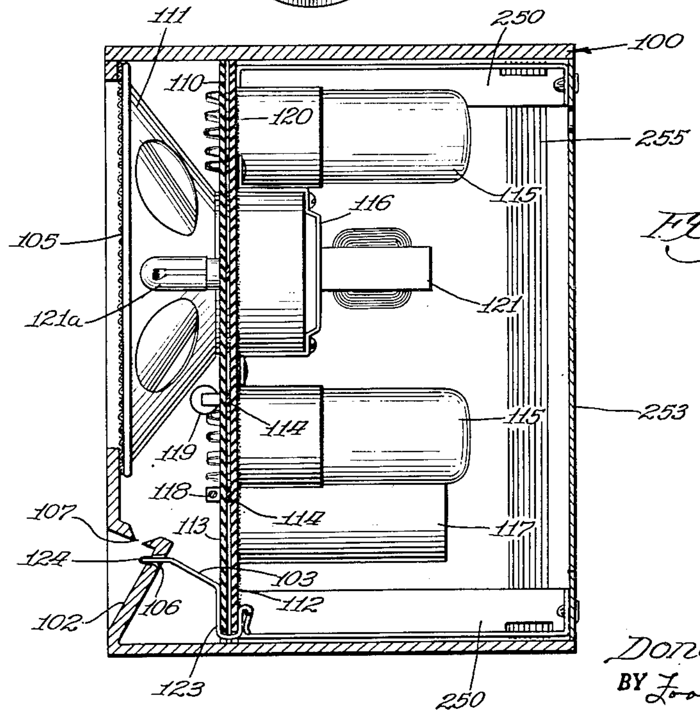
Fig. 2 is a cross-sectional view along the lines 2—2 of Fig. 1.

The position of the radio chassis in the receiver cabinet is illustrated in Fig. 2, which shows the chassis 110 vertically positioned with loud speaker 111 adjacent the grille 105 and with the pointer 103 extending through opening 106 in the cabinet. The chassis 110 is composed of a pair of insulating sheets 112 and 113 between which a plurality of metal conducting strips 114 are supported. A plurality of openings are provided in the sheets through which terminals of the conducting strips 114 and terminals of the equipment supported on the chassis extend. It is apparent from Fig. 2 that the tubes 115 and intermediate frequency units 117 are supported on one side of the chassis which will be referred to as the "tube" side of the chassis and that resistors 118 and condensers 119 are mounted on the other side of the chassis which will be generally called the "pin" side of the chassis. A dial light 121a is provided on the "pin" side of the chassis and arranged so that light therefrom projects through a slot 107 in the cabinet for the receiver to illuminate the scale 102. The chassis includes a central opening through which the magnet structure of the loud speaker 111 is positioned, the speaker being supported by bracket 116. An output transformer 121 is also supported by the loud speaker supporting bracket 116.

Figure 3:
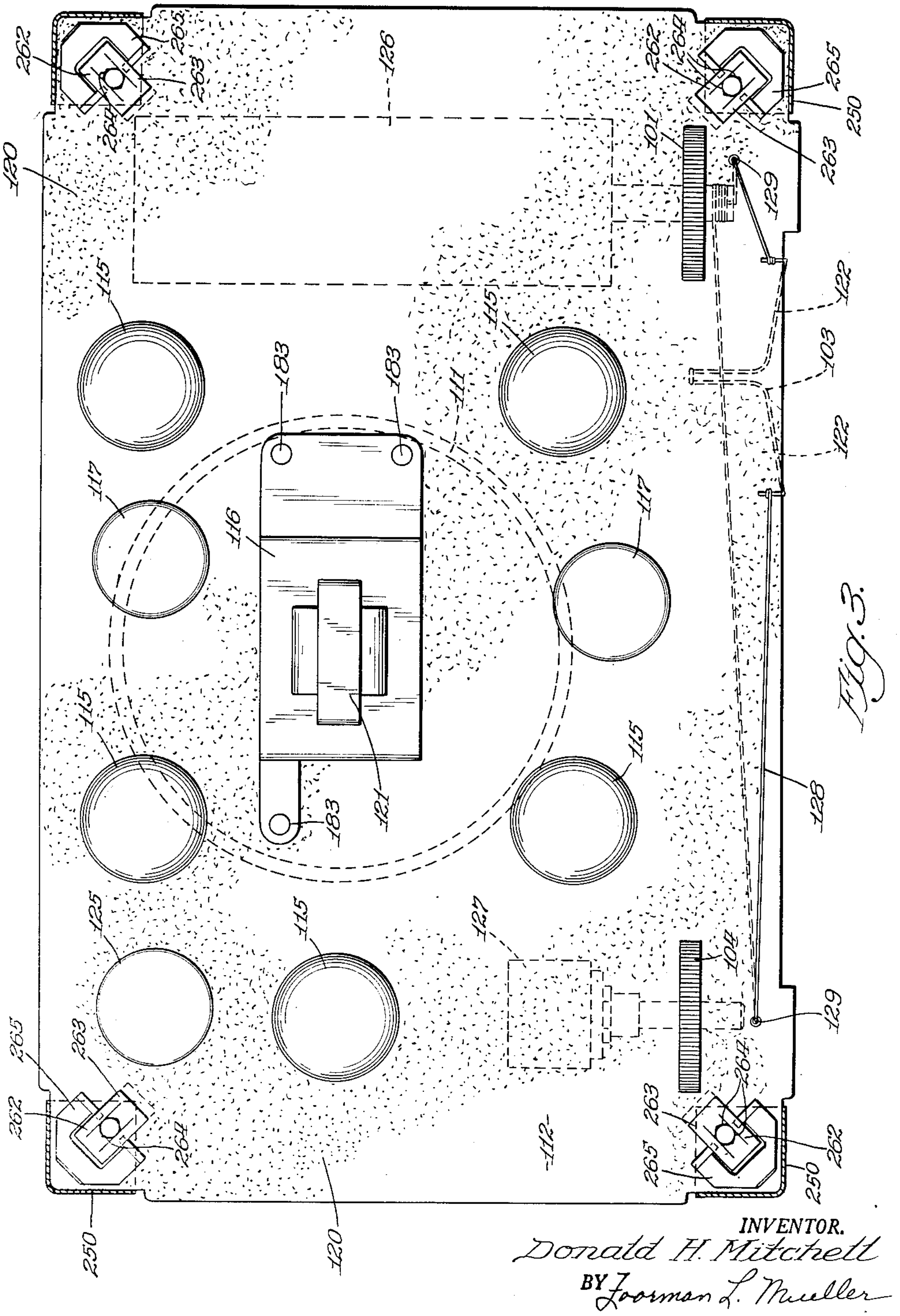
Fig. 3 is a view of the radio receiver chassis from the "tube" side.

Fig. 3 is a view of the chassis from the "tube" side showing the arrangement of the tubes 115, intermediate frequency units 117 and electrolytic condenser 125 on the chassis. This figure also illustrates the position of the loud speaker 111, the tuner 126, and the volume control 127 which are positioned on the "pin" side of the chassis. A conducting coating 120 is provided on the insulating sheet 112 on the "tube" side of the chassis. This coating can be provided by securing a metal foil on the sheet 112 or depositing a conducting coating thereon. The coating may be grounded so that the shielding cans of the various components can be automatically grounded by making contact therewith. Other circuits can be grounded to the coating as will be hereinafter described.

Figure 4:
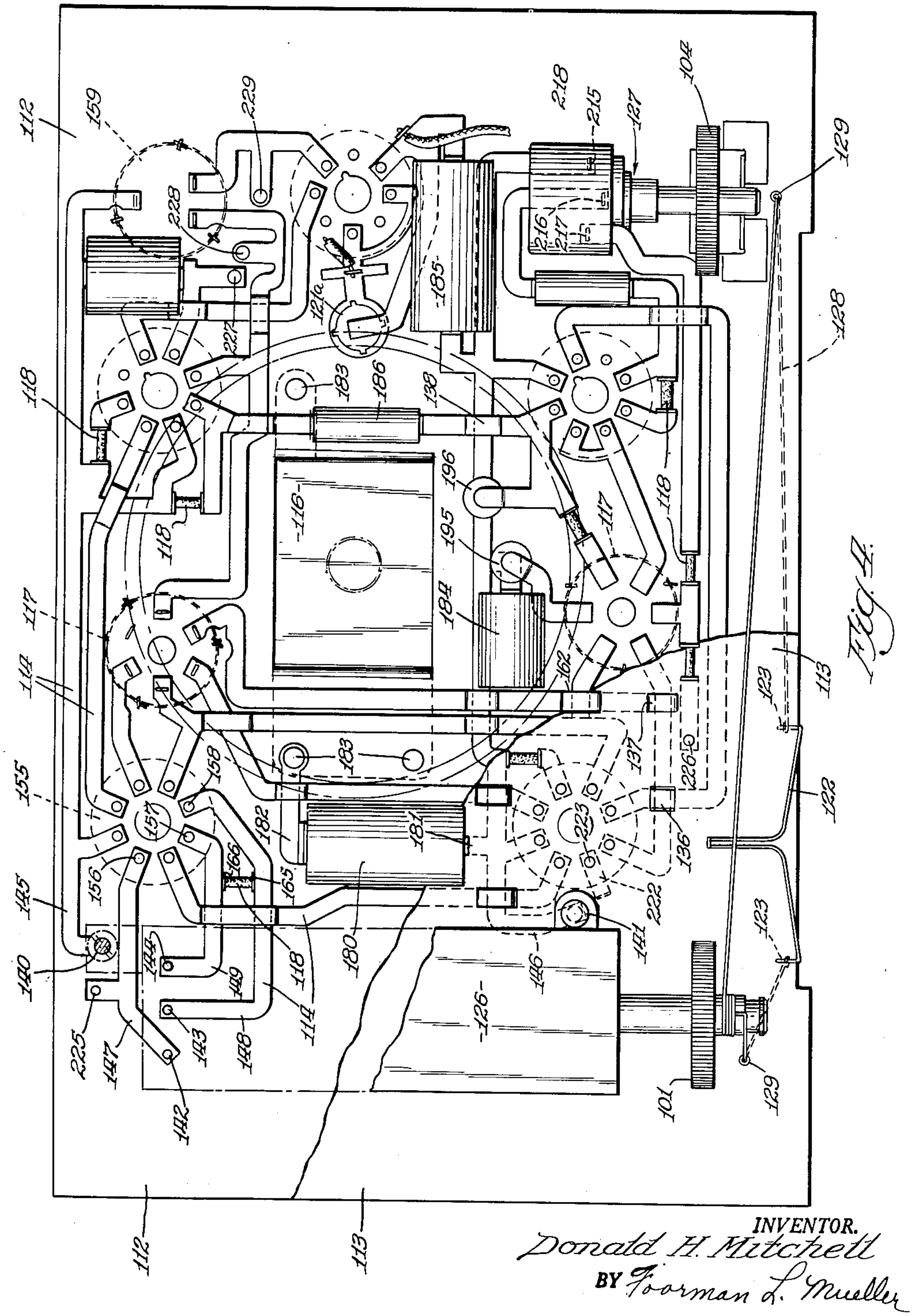
Fig. 4 is a view of the chassis from the "pin" side.

The construction of the scale pointer 103 and the manner in which it is supported on the chassis and is moved in accordance with the position of control wheel 101 is apparent from Figs. 2, 3 and 4. The pointer is formed of wire and includes two arms 122 having curved ends 123 adapted to hook over the bottom edge of the chassis as shown in Fig. 2. The chassis includes a slot at the bottom along which the pointer may slide. A tip 124 (Fig. 2) of plastic or other material which will make a pleasing appearance may be provided for the end of the pointer extending through slot 106. The pointer 103 is supported and moved by a flexible cable 128 which is wound about the shaft on which the control wheel 101 is mounted so that movement of the wheel will be transmitted to the pointer. Openings 129 are provided in the chassis to support and guide the cable.

Fig. 4 is a view from the "pin" side of the chassis with a part of the insulating sheet 113 broken away to better show the position of the conducting strips 114. The complete interconnecting wiring for the various components on the receiver is shown in this figure. The conducting strips 114 are illustrated as being of various shapes, the strips generally having terminals on the ends thereof and many strips having branches thereon so that a plurality of terminals may be provided on the strip. The strips may be punched from any suitable conducting material such as brass which is sufficiently rigid to support the components and resilient so that the components can be snapped in place and held there. As will be explained more in detail the terminals extend through openings in the sheet 113 to properly position the strips on the chassis, the strips being held in place when the sheets 112 and 113 are secured together. It is not believed necessary to point out in detail the connection of all the various components shown in Fig. 4, but certain components which are representative of the complete chassis will be described and the detailed mountings therefor will be explained in connection with the figures showing such mountings.

Figures 13, 14, 15, 16, 17, 18, 19, 20, 21, 22, 23, 36:
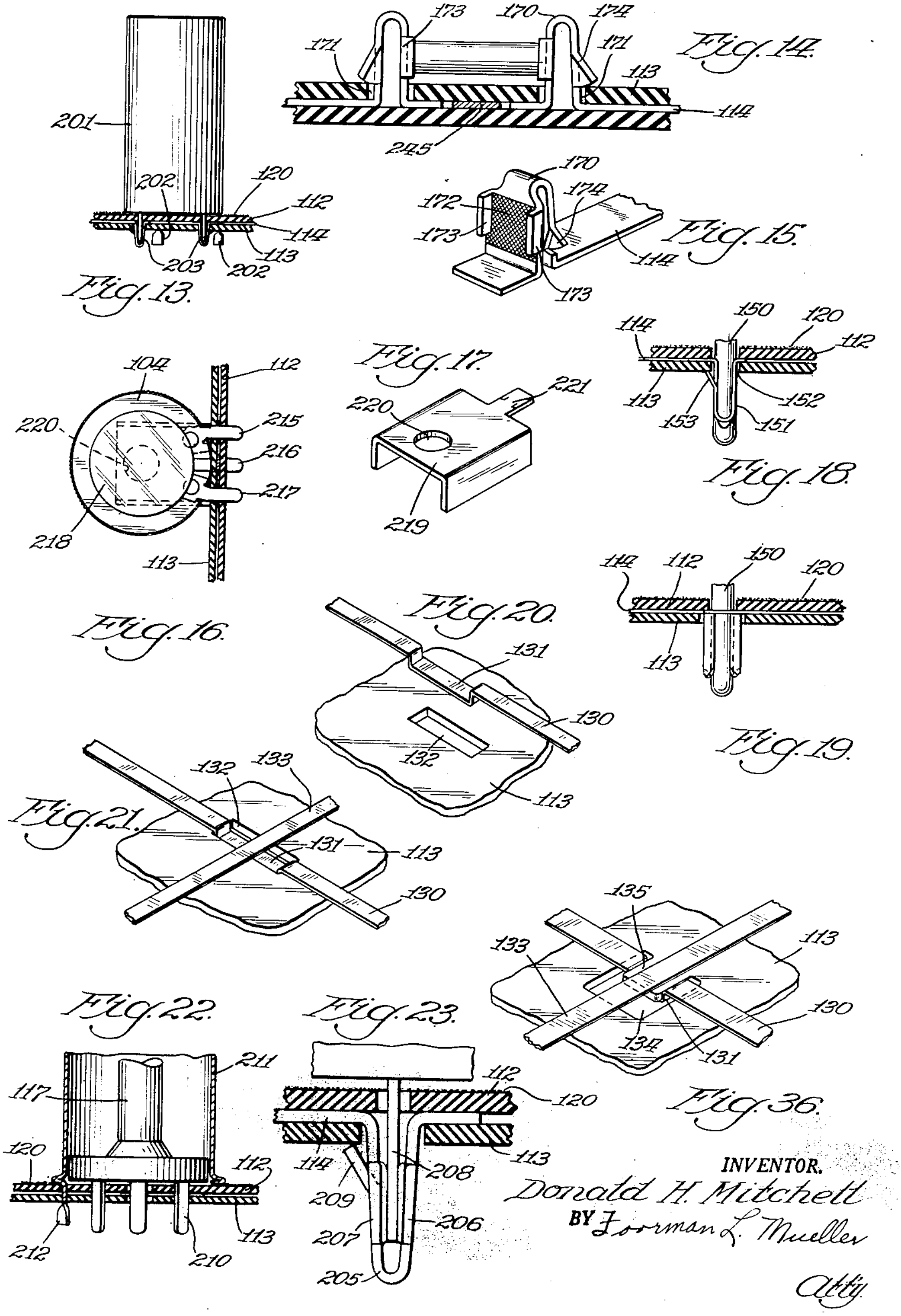
Fig. 13 illustrates the manner in which an electrolytic condenser is supported on the chassis.
Figs. 14 and 15 illustrate a resistor mounting.
Fig. 16 illustrates the mounting of the volume control on the chassis.
Fig. 17 is a detail of the volume control mounting bracket.
Figs. 18 and 19 illustrate the means for connecting a round terminal such as a vacuum tube pin.
Figs. 20 and 21 illustrate one method of providing cross-over of the conducting strips.
Fig. 22 illustrates the mounting of an intermediate frequency coil unit.
Fig. 23 illustrates the means for making connections with flat terminals.
Fig. 36 illustrates an alternative method of providing crossover of the conducting strips.

For providing crossover of the conducting strips, openings are provided in the sheet 113 into which a loop formed in one of the strips may extend to provide clearance between the strips. This feature is illustrated in Figs. 20 and 21 in which a strip 130 is illustrated having a loop 131 formed therein which is adapted to be positioned in opening 132 in the insulating sheet 113. After the loop 131 is positioned in the opening 132 a second strip 133 can be placed on the insulating sheet 113 with the space between the strips 130 and 133 preventing shorting of the two circuits. The loops in the conducting strips together with the terminals thereon may be used to accurately position the strips with respect to the sheet to facilitate assembly thereof. A plurality of crossovers as above described appear in Fig. 4, the crossovers indicated at 136, 137 and 138 being examples. Fig. 36 illustrates a modified crossover arrangement wherein an opening 134 is provided in the sheet 113 having a tongue 135 extending therein. It is apparent that the strip 130 may be positioned on the sheet 113 and the loop 131 in the strip slid under the tongue 135. The tongue 135 provides insulating material between the strips 130 and 133 to positively prevent interconnection thereof.

In Fig. 4, the tuner 126 is shown supported on the chassis by two mounting screws 140 and 141. The tuner may be of any desired construction, a tuner as disclosed in my copending application, Serial No. 728,695, filed February 14, 1947, being especially suitable. It is noted that the mounting screws 140 and 141 make connection with conducting strips 145 and 146 respectively, the tuner frame being utilized to continue the grounding connection between these two strips. For connecting the tuner in the radio circuit, pins 142, 143 and 144 are provided thereon which are preferably round and make connection with conducting strips 147, 148 and 149 in the manner shown in Figs. 18 and 19. In these figures a round pin 150 is shown positioned in a U-shaped resilient terminal 151. The terminal 151 is provided on the end of a conducting strip 114 and is positioned in an opening 152 in the sheet 113. As is clearly shown in Fig. 19 the terminal 151 is split to provide four clamping edges which engage the pin 150 to firmly secure the pin in the socket and make good electrical contact therewith. A struck out portion 153 anchors the terminal securely to the insulating sheet 113.

Figures 24, 25, 26, 27, 28, 29, 30, 31, 32, 33, 34:
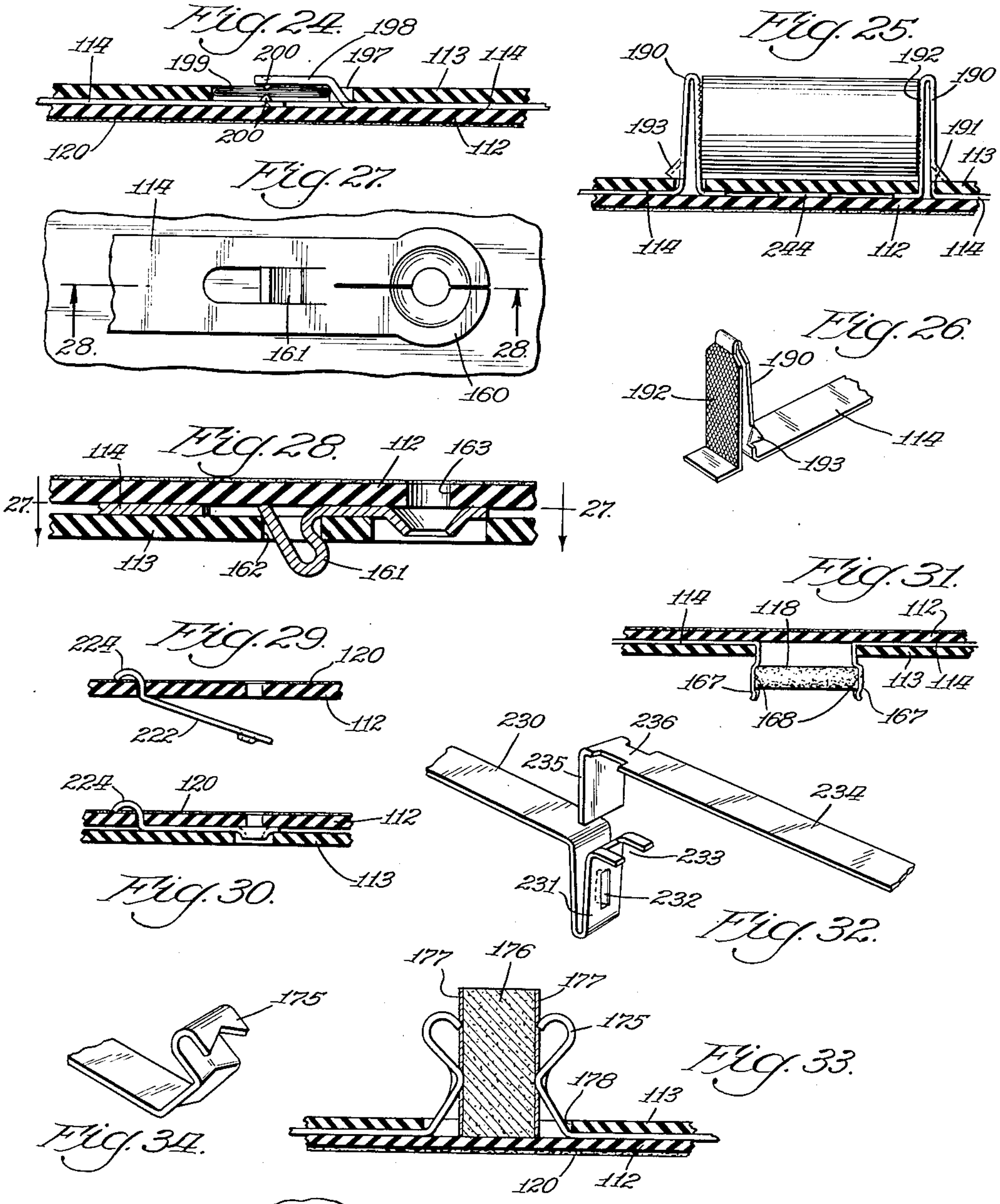
Fig. 24 illustrates the mounting of a flat wafer condenser.
Figs. 25 and 26 illustrate the mounting of a paper type condenser.
Figs. 27 and 28 illustrate a modified pin mounting arrangement.
Figs. 29 and 30 illustrate a grounding clip for a pin terminal.
Fig. 31 illustrates a modified resistor mounting.
Fig. 32 shows an arrangement for interconnecting conducting strips.
Figs. 33 and 34 illustrate a mounting for a rectangular resistor.

The conducting strips 147, 148 and 149 connect the tuner 126 to converter tube 155, the tube including pins 156, 157 and 158 engaging the terminals on the conducting strips 147, 148 and 149 respectively and other pins engaging other strips for properly connecting the tube in the circuit. The pins of the vacuum tube 155 may be the usual round pins which may be connected to the conducting strips in the manner illustrated in Figs. 18 and 19, and previously described. Alternatively, terminals as illustrated in Figs. 27 and 28 may be used for connecting the tube. In these figures, the strip 114 terminates in a cup-shaped end 160 which is split to form a clamping surface which will make a tight connection with the tube pins. A clip portion 161 may be punched out of the strip 114 and snapped into an opening 162 in the insulating sheet 113 to anchor the terminal in place, an opening 163 is of course provided in the insulating sheet 112 through which the tube pin may extend.

For connecting resistors 118 in the circuit, projections are provided on the conducting strips 114 which extend through openings in the sheet 113. Such projections are shown on conducting strips 148 and 149 (Fig. 4) with the projections being indicated as 165 and 166. The construction of the resistor terminals will, of course, depend upon the type of resistor used. Figs. 14 and 15 illustrate terminals adapted to support and connect a resistor in the form of a small cylindrical rod of compressed resistance material. In these figures, the conducting strips 114 include resilient U-shaped projections 170 on the ends thereof which extend through openings 171 in the insulating sheet 113. The projections 170 include a surface 172 which is roughened as by knurling or grating against which an end of the resistor is positioned, and projecting edges 173 to prevent displacement of the resistor due to movement from the side. A struck out portion 174 is provided on the U-shaped projection to anchor the terminal to the insulating sheet 113. Fig. 31 illustrates a somewhat simpler mounting for a cylindrical rod type resistor comprising projecting terminals 167 having cup-shaped ends into which the resistor is seated. The terminals are resilient to hold the resistor in place and include projections 168 at the center thereof for making good electrical contact with the resistor.

In Figs. 33 and 34 terminals 175 are illustrated which are adapted to receive a flat resistor 176. Such a resistor might be formed of compressed resistance material having conducting material 177 on two edges thereof. The terminals 175 project through an opening 178 in the insulating sheet 113 and the resistor is slid down between the terminals against the insulating sheet 112 to provide a secure mounting therefor.

In Fig. 4 there is illustrated a plurality of paper type condensers, some of these condensers being designated 180, 184, 185 and 186. These condensers are formed by rolling a pair of conducting sheets with dielectric material interposed therebetween and having one conducting sheet extend to one end of the roll and the other sheet extend to the other end so that connection can be made to the two sheets by making contact with the ends of the roll. The condenser 180 is supported and connected by conducting strips 181 and 182. The conducting strip 181 is of the type previously described whereas the conducting strip 182 is a strip extending across the top of the chassis being connected to one of the mounting studs 183 for the loud speaker bracket 116. Other condensers such as 184, 185 and 186 are supported on each end by the usual conducting strips. Figs. 25 and 26 illustrate the details of the mounting for such condensers, the mounting including resilient U-shaped terminals 190 on the ends of conducting strips 114 which extend through openings 191 in the insulating sheet 113. Each of these terminals includes a roughened surface 192 which is arranged to apply pressure to the end of a condenser as is illustrated in Fig. 25. A struck out portion 193 engages the insulating sheet 113 to hold the terminal in place.

Condensers in the form of thin round wafers are also used in the circuit and are indicated at 195 and 196 in Fig. 4. These condensers are adapted to be connected in a circuit by making contact to the faces thereof. The details of the mounting for this type of condenser are illustrated in Fig. 24 which illustrates the wafer as mounted in the opening 197 in the insulating sheet 113 with one of the conducting strips 114 having extension 198 overlying a second conducting strip and the condenser 199 positioned therebetween. The second conducting strip and the extension have projections 200 thereon which make electrical contact with the two faces of the condenser.

The mounting of the electrolytic condenser 159 is illustrated in Fig. 13 which shows the condenser including a can 201 having projections 202 which extend through openings in the chassis, the projections 202 being twisted to hold securely the can in place. Any other suitable means can, of course, be used for securing the condenser on the chassis. Flat connecting pins 203 are provided for making connection to the conducting strips, the specific terminal used for making connection to the pins being illustrated in Fig. 23. As previously stated the electrolytic condenser is mounted on the "tube" side of the chassis and the pins 203 extend through openings in the chassis and connections are made thereto on the "pin" side of the chassis. In Fig. 23, a terminal 205 is illustrated on the end of the conducting strip 114, the terminal being of U-shaped configuration and having punched out portions 206 and 207 on either side of the U adapted to engage the flat side of a pin 208 which is positioned therebetween. The terminal is made of resilient material so that it will adjust itself and make good connection to the pin even when slight errors in positioning occur due to manufacturing tolerances. The terminal includes a struck out portion 209 for anchoring the same to the insulating sheet 113.

The mountings of the intermediate frequency coil units 117 are generally similar to that of the electrolytic condenser except that the shield can is not integrally connected to the coil unit. Fig. 22 shows the mounting of the intermediate frequency coil unit which includes flat connecting pins 210 which extend through the chassis and engage terminals as illustrated in Fig. 23 and previously described.

The can 211 for the unit includes a plurality of lugs 212 which are positioned through openings in the chassis and then twisted to hold the can securely to the chassis. As in the case of the electrolytic condenser, the can is grounded to the conducting coating 120 on the sheet 112. As previously stated, however, the coil unit 117 may be secured by the terminals 210 alone and the can separately supported on the chassis.

The method of mounting and connecting the volume control 127 is illustrated in Figs. 16 and 17. The volume control is illustrated as including three terminals 215, 216 and 217 which are preferably flat connecting pins similar to those on the electrolytic condenser and intermediate frequency unit and which will be arranged to engage similar terminals (illustrated in Fig. 23). These connecting pins are positioned on the body portion of the volume control indicated as 218, as is clearly shown in Fig. 4. For supporting the other end of the volume control on which the operating wheel 104 is positioned, a supporting bracket 219 is provided. This bracket includes an opening 220 through which the control shaft extends and a projecting lug 221 which is positioned in an opening of the chassis and then twisted to secure the supporting bracket 219 firmly to the chassis (Fig. 17). As is apparent from a consideration of Figs. 1 and 4 the control wheel 104 of the volume control and also the control wheel 101 of the tuner are positioned so that they may extend through openings in a chassis to be in operating position at the front of the cabinet.

In Figs. 29 and 30 there is illustrated a clip 222 which is used in the chassis for grounding a pin, such as a vacuum tube terminal, to the conducting coating on the "tube" side of the chassis. Such a clip is illustrated for grounding the pin 223 of the vacuum tube in the lower left-hand corner of Fig. 4. The clip 222 includes a body portion which extends between the insulating sheets 112 and 113 having an opening adapted to securely engage a pin. The clip also includes a hook portion 224 which extends through sheet 112 and securely engages the conducting coating 120 thereon to provide a grounding connection for the pin 223.

For connecting an antenna to the radio circuit formed by the conducting strips in the chassis, terminals 225 and 226 are provided (Fig. 4). These terminals are adapted to receive round pins which can be provided on the ends of the antenna wire. The antenna is supported by a framework secured to the chassis as will be hereinafter explained. For connecting the loud speaker to the radio circuit, terminals 227, 228 and 229 are provided. These terminals are adapted to receive round pins and are arranged close together in a row so that a standard plug can be used to connect the leads from the loud speaker into the circuit.

In applying the chassis in accordance with the invention to complicated electronic equipment, many applications will be encountered in which a conducting strip is required for making a common connection to a great number of components. Such strips may be very long and include a great number of terminals making it impractical to punch out the strip with sufficient accuracy that the terminals of the strip will fit properly in openings provided therefor in the insulating sheets of the chassis. In such instances it may be desirable to divide the strip into a plurality of shorter strip parts which may be connected to each other in the manner illustrated in Fig. 32. In this figure the conducting strip 230 includes a resilient U-shaped terminal 231 thereon generally similar to the terminal illustrated in Fig. 23 for connecting flat connecting pins. This terminal includes punched out portions 232 on the two sides of the U-shaped terminal and a slotted end portion 233. The conducting strip 234 includes a right angle projection 235 adapted to be positioned in the U-shaped portion 231 whereby it is engaged by the punched out portions 232, the strip 234 having a reduced portion 236 adapted to fit in the slot 233 of the terminal. It is, therefore, seen that a simple and effective arrangement for electrically connecting the conducting strips 233 and 234 is provided.

Figure 35:
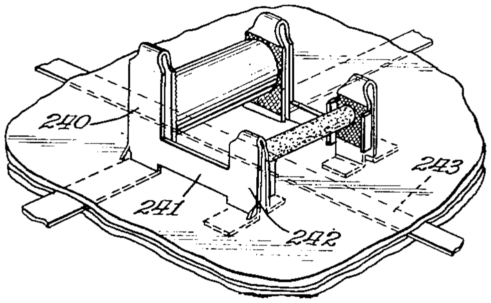
Fig. 35 illustrates a combined condenser and resistor mounting and a circuit crossover.

It may be desirable in certain applications to provide a combined mounting for a condenser and a resistor. That is, in applications where a condenser is used to bypass a resistor, a combined mounting for the condenser and resistor can be provided. Such an arrangement as illustrated in Fig. 35 wherein a condenser mounting as illustrated in Figs. 25 and 26 is combined with a resistor mounting as illustrated in Figs. 15 and 15. The condenser mounting comprises a resilient U-shaped terminal 240 which is connected by a strip 241 to a U-shaped resistor terminal 242. Although similar terminals are shown connecting the other ends of the condenser and resistor, it is obvious that the condenser and resistor might have only one common terminal with separate terminals for the other ends of the components.

Fig. 35 also illustrates the use of a resistor and a condenser to form a circuit crossover. That is, the condenser and resistor provide a crossover of a circuit in which they are connected with the circuit of conducting strip 243 positioned in the chassis directly below the components. It is obvious that this arrangement can be used for a single condenser or resistor individually, Fig. 25 illustrating a conducting strip 244 which extends under a condenser and Fig. 14 illustrating a conducting strip 245 extending under the resistor of this figure.

Figures 5, 6, 7, 8:
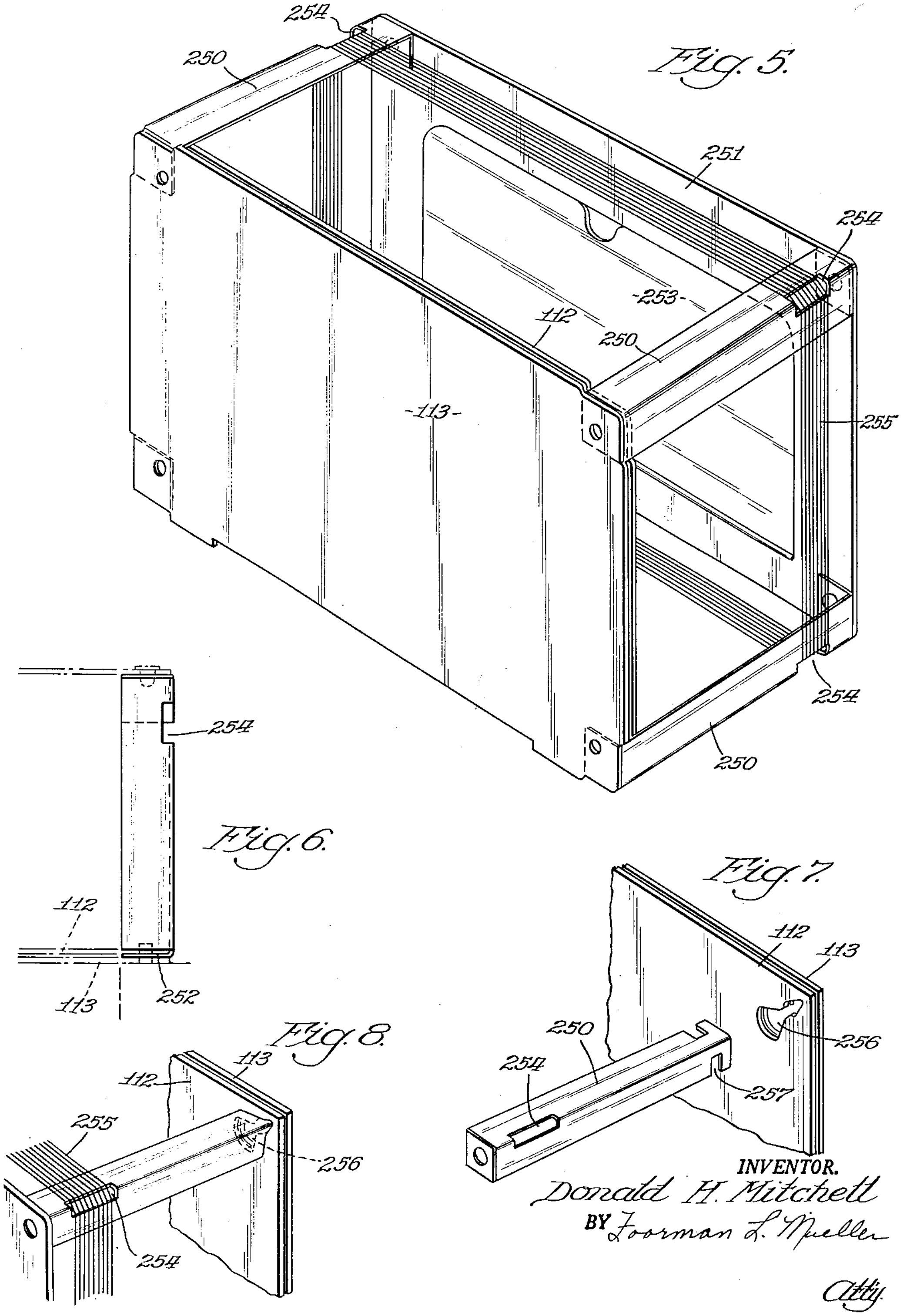
Fig. 5 illustrates the framework for supporting the loop antenna from the chassis.
Fig. 6 is a detailed view showing the manner in which the framework of Fig. 5 is connected to the chassis.
Figs. 7 and 8 illustrate a modified structure for supporting the loop antenna from the radio chassis.

The manner in which the loop antenna and the back closure of the receiver is supported on the receiver chassis is illustrated in Figs. 5 and 6. In Fig. 5, a framework of fiber or other insulating material is shown supported to the corners of the chassis, the framework comprising angle-shaped members 250 and a back closure 251. The angle-shaped members may be secured to the chassis by providing an extending portion 252 thereon which is positioned between the insulating sheets 112 and 113 of the chassis as illustrated in Fig. 6. Any suitable means may be provided for securing insulating sheets 112 and 113 together with the portion 252 interposed therebetween. The angle-shaped members are also secured to the back closure member 251 which includes a hinged door 253 providing access to the "tube"side of the chassis. The angle members 250 include notched out portions 254 around which antenna wire 255 it wound to provide a loop antenna. It is, therefore, seen that the chassis includes all of the operating components of the receiver so that a completely operable set is provided which can be completely adjusted and aligned prior to mounting thereof in a cabinet.

A modified method of securing the framework to the chassis is illustrated in Figs. 7 and 8 in which the chassis is shown as having keyshaped openings 256 in the corners thereof and the angle members 250 include slots 257 in the end thereof adapted to be supported on the chassis. When the end of an angle member is compressed it can be inserted in the opening 256 after which it will expand to its normal shape and be thereby anchored to the chassis. The assembled structure is illustrated in Fig. 8.

Figure 9:
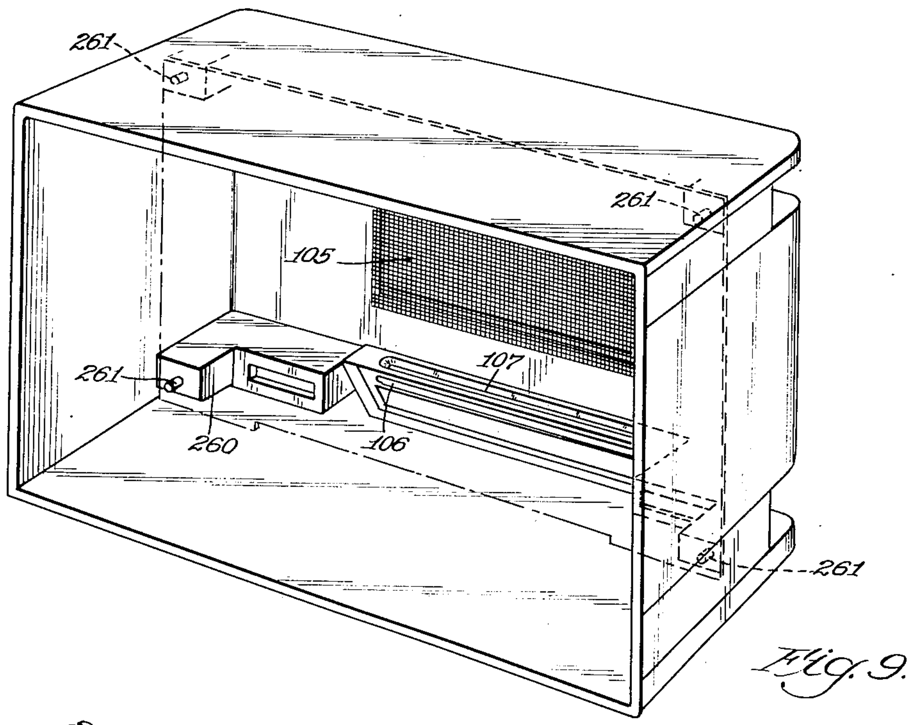
Fig. 9 is an interior view of the receiver cabinet illustrating the manner in which the chassis is mounted thereon.

Simple means for detachably securing the chassis in the radio cabinet are provided and are illustrated in Figs. 3, 9, 10 and 11. In Fig. 9 the cabinet is illustrated and the position of the chassis therein is shown in dot-dash lines. The cabinet includes posts 260 in the corner thereof on which pins 261 are mounted. The chassis includes openings at the corners adapted to receive the pins and quick release type clips 262 adapted to engage the pins 261 to hold the chassis in place. The operation of the quick release clips 262 is apparent from Figs. 3, 10 and 11 wherein the clips are illustrated as comprising spring-like strips 263 positioned between the sheets 112 and 113 of the chassis and having V-shaped engaging edges 264. A latch 265 is provided having portions resting between the insulating strip 113 and the spring portion 263 so that as the latch is moved from the solid position to the dotted position shown in Fig. 5, the spring-like strip 263 is flexed from the solid position to the dotted position thereby releasing the engagement of the V-shaped edges on the post 261.

Figure 10:
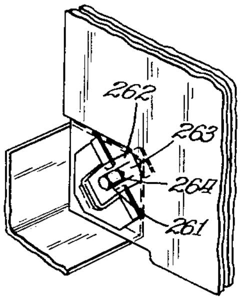
Figs. 10 and 11 are detailed views of the chassis supporting clips.
Figure 11:
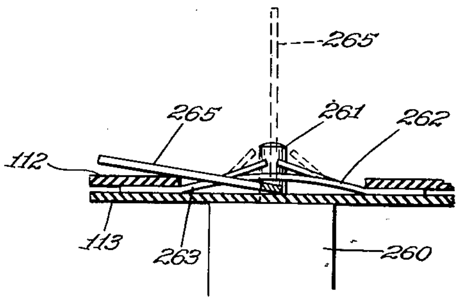
Figure 12:
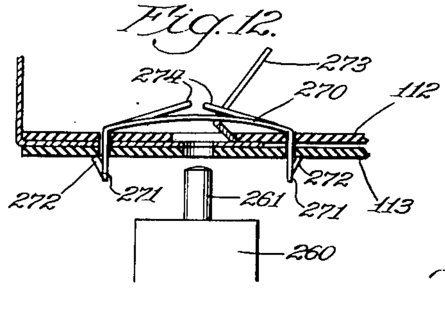
Fig. 12 is a detailed view of the modified chassis supporting clip.

In Fig. 12 an alternative detachable clip is illustrated which operates generally similar to the clip illustrated in Figs. 3, 10 and 11. The spring member 270, however, instead of being positioned between the insulating sheets of the chassis, includes end portions 271 which extend through openings in the chassis and have struck-out portions 272 which secure the clips to the chassis and hold the insulating sheets 112 and 113 together. The use of such a clip would eliminate the need for separate means for holding the insulating sheets of the chassis together. A latch 273 is provided for disengaging the clip from the pins 261, the latch being arranged so that in the normal position perpendicular to the chassis, the prongs 274 engage the pin 261, and when it is moved against the chassis the pin 261 will be released.

Figure 37:
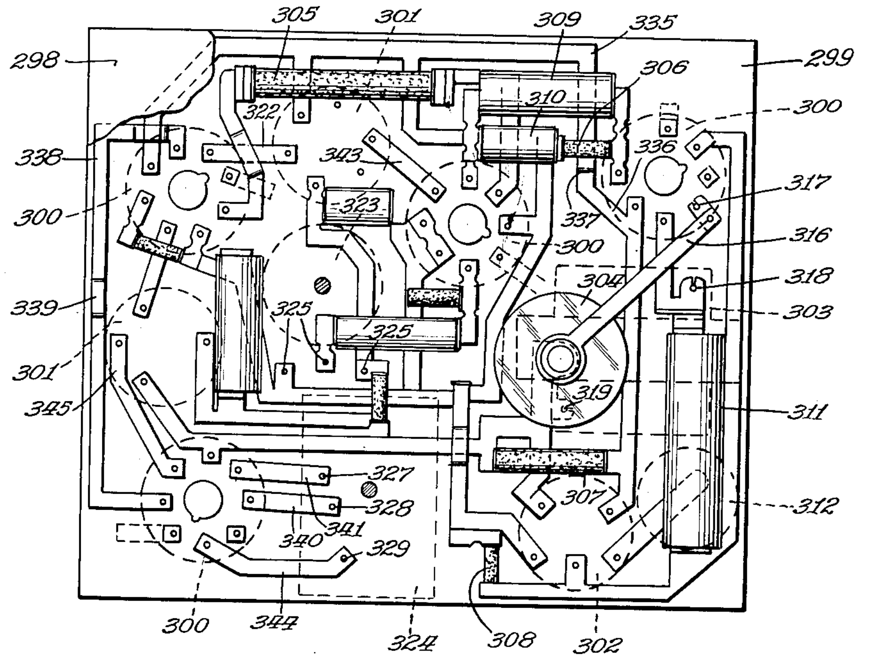
Fig. 37 is a view from the "pin" side of a very small chassis in accordance with the invention.
Figure 38:
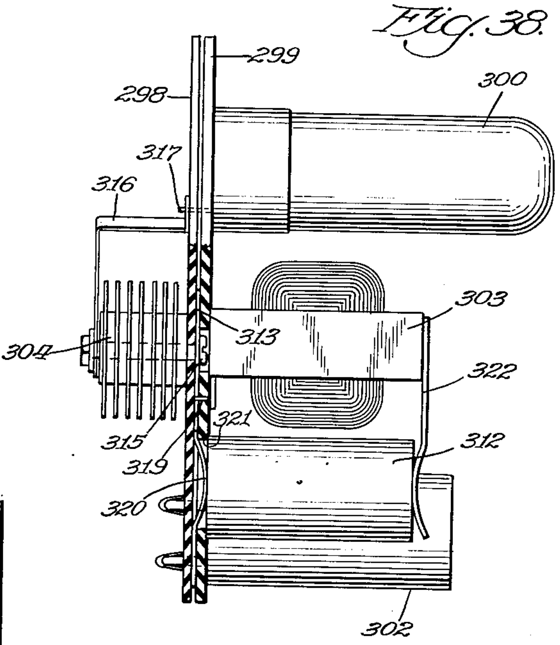
Figs. 38 and 39 are cross-sectional views showing the mounting of various components on the chassis of Fig. 37.
Figure 39:
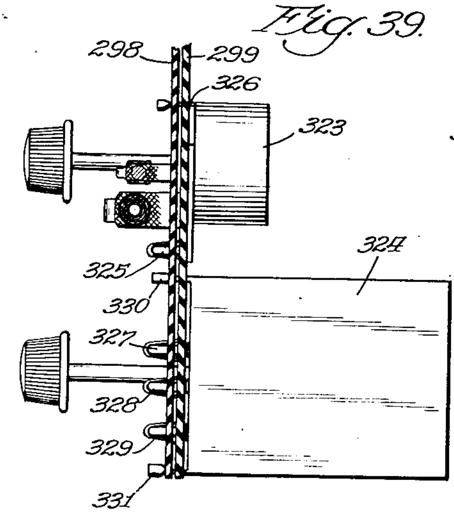

In Fig. 37 there is illustrated a very small radio chassis in accordance with the invention which does not include a loud speaker mounted directly on the chassis as in the receiver previously described. The size of an entire radio receiver chassis constructed in accordance with this arrangement may be only approximately 4¼ inches by 5¼ inches. This chassis, as in the chassis previously described, has the tubes and other large components supported on one side thereof and the terminals, resistors and condensers positioned on the other side. The chassis is formed by two insulating sheets 298 and 299 with conducting strips positioned therebetween (Figs. 38 and 39). The strips and the terminals thereon for mounting and connecting the components are of the same construction as those previously described. The position of the components, however, is particularly arranged so that a minimum amount of space is required and so that the conducting strips are as simple and have as few crossovers as possible. In Fig. 37 the tubes are indicated at 300, the intermediate frequency coil units at 301, the electrolytic condenser at 302, the output transformer at 303 and a dry rectifier is indicated at 304.

In Fig. 37 the pins of all of the units, that is the intermediate frequency units and the electrolytic unit as well as the tubes are illustrated as being round. Connections are made to the pins by terminals as illustrated in Figs. 18 and 19. It is apparent that the positioning of the conducting strips need not be as accurate for receiving a round pin as a flat terminal so that by using all round pins, fewer types of terminals are required and it is not necessary that the strips and terminals be as accurately constructed. Both of these features are very material in reducing the cost of the chassis. It is to be noted that resistors 305, 306, 307, 308, etc. are of various sizes, the size depending upon the value of the resistance required and upon the amount of energy which is dissipated thereby. All of the condensers in the circuit with the exception of the electrolytic unit 302 are of the rolled paper type, reference numerals 309, 310 and 311 indicating some of the condensers which may be of varying sizes depending upon the capacity thereof. The chassis of Fig. 37 includes conducting strips 335 and 336 which are joined at 337 in the manner illustrated in Fig. 32. By using two conducting strips joined together, the assembly thereof on the insulating sheet 298 with the terminals thereof positioned in the openings of the sheet is facilitated. The conducting strip 338 which is relatively long includes a loop 339 near the center thereof which is positioned in an opening in the insulating sheet 298. This provides flexibility in the strip so that the terminals thereof will shift to receive the tube pins even when there is a slight error in the dimensions thereof due to manufacturing tolerances. It is to be noted that in Fig. 37, various resistors and condensers are used to provide crossover of the various circuits. As an example condenser 309 and resistor 306 both cross over the strip 335 and resistor 305 crosses over two different arms of conducting strip 335. These crossovers are in accordance with the detail views of Figs. 14, 25 and 35.

Various ones of the conducting strips can be made identical to reduce the number of different parts and thereby further reduce the cost of the chassis. For example, conducting strips 340, 341, 342 and 343 are all identical and conducting strips 344 and 345 are identical. By careful design a great number of identical strips can generally be used on any particular chassis to thereby simplify the construction of the chassis.

Fig. 38 shows a partial cross-sectional view of the chassis illustrating in particular the mounting of the rectifier 304, the transformer 303, electrolytic condenser 302 and a paper condenser 312. It is noted that the rectifier 304 is secured to the chassis by a bolt 315 which is positioned in an opening in the insulating sheet 112 so that it does not contact components mounted on the "tube" side of the chassis. The bolt 315 engages conducting strip 313 to form one terminal for the rectifier and the other terminal of the rectifier is connected by the strip 316 with the tube pin 317 as shown in the upper right hand corner of Fig. 37. The transformer 303 includes connecting pins 318 and 319 for connecting to conducting strips in the chassis in the manner previously described with reference to vacuum tubes. To facilitate the use of space, a paper condenser 312 is positioned on the "tube" side of the chassis and is mounted perpendicular to the chassis. One connection to the condenser 312 is made through conducting strip 320 which extends through an opening 321 in the insulating sheet 299 and the other connection is made by spring clip 322 which is secured to the transformer 303 in such manner to provide a ground connection for the condenser.

Fig. 39 is a second cross-sectional view of the chassis of Fig. 37 showing the mounting of the volume control 323 and the tuner 324. In this structure the volume control and tuner are mounted on the "tube" side of the chassis with the control shafts therefor positioned perpendicular to the chassis and extending therethrough. The volume control includes a plurality of pins 325 for making connection thereto and for partially supporting the volume control on the chassis. A mounting lug 326 is provided on the volume control which extends through an opening in the chassis and is twisted to thereby secure the volume control to the chassis. The tuner also contains three pins 327, 328 and 329 for making electrical connection with conducting strips, and supporting lugs 330 and 331 for securely mounting the tuner on the chassis. Connection of the pins 327, 328 and 329 to the strips 341, 340 and 344 respectively is shown in Fig. 37.

It is apparent from the foregoing that I have provided a simplified radio receiver construction wherein the various components of the receiver are mounted on a chassis and interconnected without the usual wiring and soldered connections. As the insulating sheets can be very rapidly stamped out and the conducting strips can also be very easily and cheaply formed, the cost of the complete chassis including the mounting and connecting provisions is very low. In assembling the chassis, it is merely necessary to place the conducting strips on the insulating sheet with the terminals and other projections on the strips extending through the openings therein to position the same, and then secure the two insulating sheets together to form a chassis capable of completely interconnecting the components of the set. The placing of the components on the chassis can then be very readily accomplished either by hand or by using mechanical means for feeding the components in place. After all the operating components have been assembled on the chassis, the chassis can then be mounted in a cabinet to provide a complete radio set.

In addition to the saving in cost in the construction of the chassis and assembly of the components thereon, a further reduction in cost is achieved by the simplification of the components. For example, the resistors used in the set can be very cheaply produced as they are pressed from resistance material and do not require terminals thereon. Likewise, the paper type condensers used in the set do not require connecting leads and are therefore inexpensive. The sockets for tubes, intermediate frequency units and electrolytic condensers are entirely eliminated in the structure disclosed further reducing the cost.

While I have described certain embodiments of my invention which are illustrative thereof, it is obvious that various changes and modifications can be made therein which are within the intended scope of the invention as defined in the appended claims.

I claim:

1. Electronic equipment substantially free of bonded circuit connections, comprising an elongated electrical component having electrical connecting means at the ends thereof, a chassis including a pair of insulating sheets with openings therein, and at least two preformed conducting strips positioned between said sheets, each of said strips having a U-shaped resilient terminal portion formed therein and positioned in an opening in one of said sheets and extending to one side of said chassis, said strips including portions on both sides of said U-shaped resilient portions which are positioned between and supported by said sheets, said terminal portions on said conducting strips having conductive surfaces for engaging said conducting means on said elongated electrical component, said conductive surfaces being positioned to frictionally engage said conducting means to support said elongated component therebetween on said one side of said chassis and make electrical contact therewith.

2. Electronic equipment substantially free of bonded circuit connections, comprising an elongated electrical component mounted on said chassis having electrical connecting means at the ends thereof, a chassis including a pair of insulating sheets with openings therein and at least three preformed conducting strips positioned between said sheets, two of said strips having U-shaped resilient terminal portions formed therein and positioned in openings in one of said sheets and extending to one side of said chassis, said strips including portions on both sides of said U-shaped resilient portions which are positioned between and supported by said sheets, said U-shaped terminal portions having conductive surfaces for engaging said conducting means on said elongated electrical component, said conductive surfaces being positioned to frictionally engage said connecting means to support said elongated component therebetween on said one side of said chassis and make electrical contact therewith, said third conducting strip extending between said sheets in the space between said terminal portions to provide a circuit crossover.

3. Electronic equipment substantially free of bonded circuit connections, comprising a chassis, said chassis including a pair of insulating sheets with openings therein, and at least two preformed conducting strips positioned between said sheets, one of said strips having a U-shaped resilient terminal portion formed therein and positioned in an opening in one of said sheets and extending to one side of said chassis, said one strip including portions on both sides of said U-shaped resilient portion which are positioned between and supported by said sheets, the other one of said strips having one end thereof formed into a right angle projection extending between the sides of said U-shaped terminal portion, said U-shaped resilient portion having conductive surfaces on the inside of said sides thereof frictionally engaging said right angle projection and making electrical contact therewith.

DONALD H. MITCHELL.

REFERENCES CITED

The following references are of record in the file of this patent:

UNITED STATES PATENTS

| Number | Name | Date |
|---|---|---|
| 1,697,215 | Wolff | Jan. 1, 1929 |
| 1,718,993 | Wermine | July 2, 1929 |
| 1,780,778 | MacFadden | Nov. 4, 1930 |
| 1,992,925 | Lodge | Feb. 26, 1935 |
| 2,017,940 | Bessey | Oct. 22, 1935 |
| 2,066,876 | Carpenter | Jan. 5, 1937 |
| 2,174,107 | Kenney | Sept. 26, 1939 |
| 2,196,697 | Eby | Apr. 9, 1940 |
| 2,244,009 | Heinschatal | June 3, 1941 |
| 2,256,803 | Hauser | Sept. 23, 1941 |
| 2,268,619 | Reid | Jan. 6, 1942 |
| 2,270,166 | Hiensch et al. | Jan. 13, 1942 |
| 2,292,163 | Shea | Aug. 4, 1942 |
| 2,411,528 | Dodington | Nov. 26, 1946 |

FOREIGN PATENTS

| Number | Country | Date |
|---|---|---|
| 269,729 | Great Britain | Apr. 28, 1927 |
| 131,290 | Australia | Jan. 10, 1933 |